United States Patent
Tseng et al.

(10) Patent No.: US 9,975,391 B2
(45) Date of Patent: May 22, 2018

(54) VEHICLE HANDLING DYNAMICS CONTROL USING FULLY ACTIVE SUSPENSION

(71) Applicant: FORD GLOBAL TECHNOLOGIES, LLC, Dearborn, MI (US)

(72) Inventors: Eric Hongtei Tseng, Canton, MI (US); Li Xu, Northville, MI (US); Davor David Hrovat, Ann Arbor, MI (US); Josko Deur, Zagreb (HR); Mirko Coric, Sibenik (HR)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days. days.

(21) Appl. No.: 14/919,923

(22) Filed: Oct. 22, 2015

(65) Prior Publication Data
US 2017/0113506 A1    Apr. 27, 2017

(51) Int. Cl.
*B60G 17/015*    (2006.01)
*B60G 17/016*    (2006.01)

(52) U.S. Cl.
CPC ...... *B60G 17/0162* (2013.01); *B60G 2400/41* (2013.01); *B60G 2500/40* (2013.01); *B60G 2600/182* (2013.01); *B60G 2800/244* (2013.01); *B60G 2800/246* (2013.01)

(58) Field of Classification Search
CPC ..... B60T 2230/03; B60W 30/02; B60G 17/01
USPC ..... 303/123, 139, 146; 701/29.2, 36, 37, 70, 701/71
See application file for complete search history.

(56) References Cited

U.S. PATENT DOCUMENTS

| | | | |
|---|---|---|---|
| 5,015,009 A | | 5/1991 | Ohyama et al. |
| 5,852,787 A | * | 12/1998 | Fodor ............... B60G 17/0162 280/124.1 |
| 6,053,509 A | * | 4/2000 | Izawa ................. B60G 17/016 280/5.504 |
| 8,838,336 B2 | | 9/2014 | Hirao et al. |
| 2004/0128044 A1 | * | 7/2004 | Hac ................... B60G 17/0195 701/48 |
| 2005/0206231 A1 | | 9/2005 | Lu et al. |
| 2006/0074530 A1 | * | 4/2006 | Meyers .............. B60G 17/016 701/1 |
| 2008/0086251 A1 | * | 4/2008 | Lu ....................... B60T 8/1755 701/70 |

(Continued)

FOREIGN PATENT DOCUMENTS

JP    4821454 B2    9/2011

OTHER PUBLICATIONS

Taehyun Shim et al., Dynamic Normal Force Control for Vehicle Stability Enhancement, Int. J. Vehicle Autonomous Systems, vol. 3, No. 1, 2005, pp. 1-14.

*Primary Examiner* — Thomas G Black
*Assistant Examiner* — Wae L Louie
(74) *Attorney, Agent, or Firm* — Jones Robb, PLLC; Raymond Coppiellie

(57) ABSTRACT

Arrangements (e.g., method, apparatus, computer-readable non-transitory media embodying a program) for compensating for understeer or oversteer behavior in a vehicle having a fully active suspension, including: determining whether an understeer or oversteer condition exists; determining a compensation torque needed to correct the understeer or oversteer condition; and generating the compensation torque by using the fully active suspension to shift tire loads between tires.

29 Claims, 13 Drawing Sheets

(56) References Cited

U.S. PATENT DOCUMENTS

| | | | |
|---|---|---|---|
| 2008/0183353 A1* | 7/2008 | Post | B60G 17/0165 701/42 |
| 2008/0243335 A1* | 10/2008 | Rao | B60C 23/0408 701/38 |
| 2011/0166744 A1* | 7/2011 | Lu | B60T 8/1755 701/29.2 |
| 2011/0231051 A1* | 9/2011 | Gerdin | B60C 23/061 701/31.4 |
| 2013/0030654 A1* | 1/2013 | Oblizajek | B62D 5/0472 701/42 |
| 2013/0158798 A1* | 6/2013 | Igarashi | B60C 23/20 701/37 |
| 2014/0145498 A1* | 5/2014 | Yamakado | B60T 8/1755 303/3 |
| 2016/0272198 A1* | 9/2016 | Matoy | B60W 30/045 |
| 2017/0113506 A1* | 4/2017 | Tseng | B60G 17/0162 |

* cited by examiner

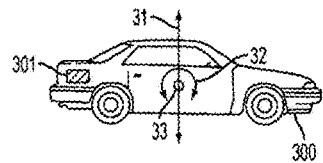
FIG. 1A
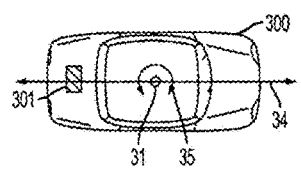
FIG. 1B
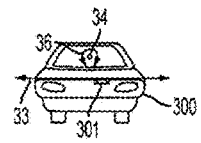
FIG. 1C
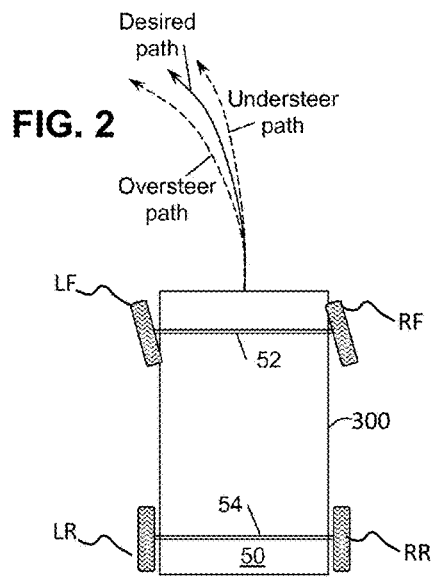
FIG. 2
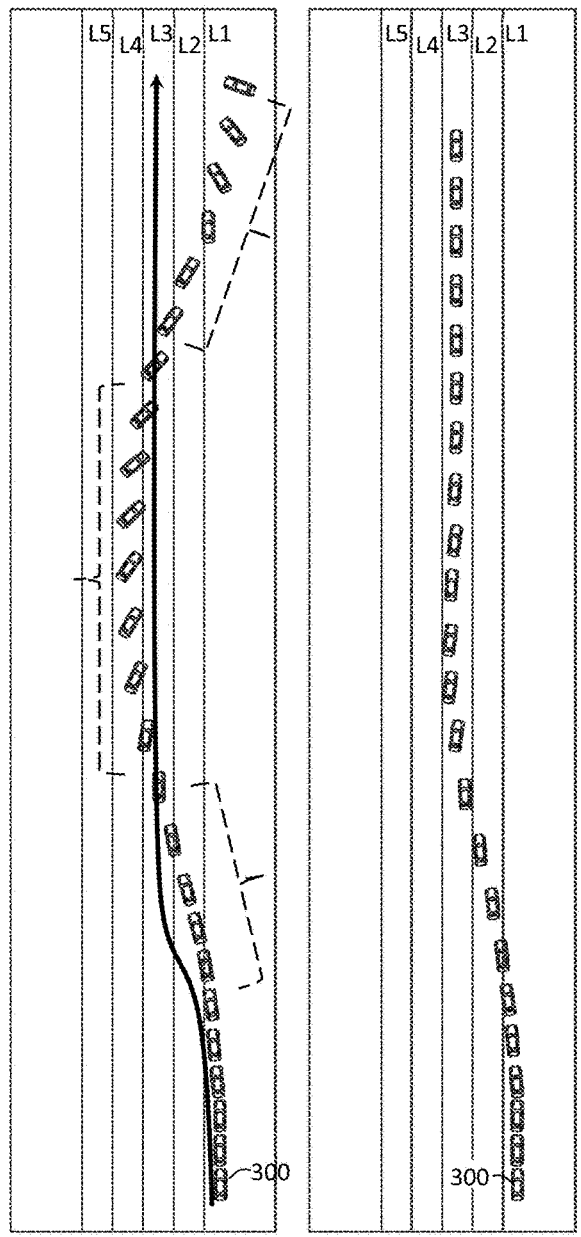
FIG. 3A  FIG. 3B

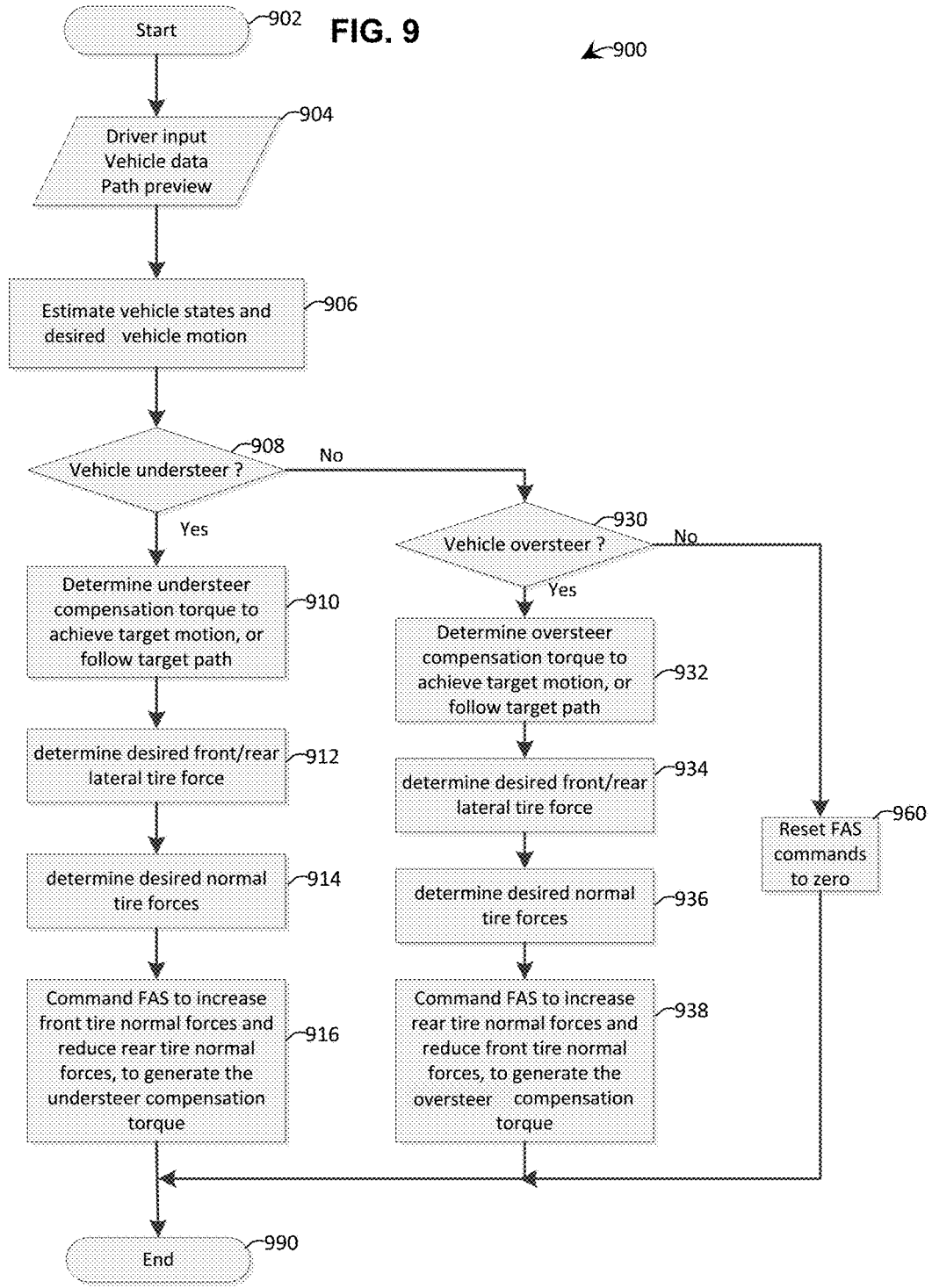

VEHICLE HANDLING DYNAMICS CONTROL USING FULLY ACTIVE SUSPENSION

TECHNICAL FIELD

The present teachings relate generally to arrangements (e.g., method, non-transitory computer-readable program-embedded media, apparatus, etc.) for vehicle handling dynamics control using fully active suspension (FAS). More specifically, the present teachings relate to arrangements using FAS for controlling road vehicle handling dynamics to achieve, for example, precise and stable cornering.

BACKGROUND

It may be desirable, for wheeled vehicles to have improved vehicle handling dynamics control in order to avoid or minimize negative handling occurrences (e.g., understeer; oversteer; etc.) from occurring.

SUMMARY

In accordance with the various example embodiments, there is disclosed a method for compensating for understeer or oversteer behavior in a vehicle having a fully active suspension, including: determining whether an understeer or oversteer condition exists; determining a compensation torque needed to correct the understeer or oversteer condition; and generating the compensation torque by using the fully active suspension to shift tire loads between tires.

Further, there is disclosed an embodiment of a method of compensating for understeer or oversteer behavior in a throttle-on situation in a vehicle having a fully active suspension, including: estimating desired vehicle motion; determining whether an understeer condition or an oversteer condition exists; determining a compensation torque needed to achieve the desired vehicle motion; and generating the compensation torque by using the fully active suspension to adjust tire loads dynamically.

As another embodiment, there is a method of providing sustained compensation for a driving condition in a vehicle having a fully active suspension, including: estimating desired vehicle motion; determining if an understeer condition or an oversteer condition exists; determining a compensation torque needed to achieve the desired vehicle motion; and stiffening one of front and rear suspensions of the vehicle and softening the other of the front and rear suspensions, to generate the compensation torque using the fully active suspension.

Still further, there is disclosed another embodiment of a method for providing compensation for a predicted driving condition in a vehicle having a fully active suspension. Including: estimating desired vehicle motion; predicting if a driving condition will occur; determining a compensation torque needed to achieve the desired vehicle motion, in view of the predicted driving condition; and generating the compensation torque using the fully active suspension, in anticipation of the predicted driving condition.

Continuing, as another embodiment, there is disclosed a vehicle control system, including: a fully active suspension; and a controller configured to: estimate desired vehicle motion; predict if a driving condition will occur; determine a compensation torque needed to achieve the desired vehicle motion, in view of the predicted driving condition; and generate the compensation torque using the fully active suspension, in anticipation of the predicted driving condition.

Additional objects and advantages will be set forth in part in the description which follows, and in part will be obvious from the description, or may be learned by practice of the present teachings. The objects and advantages of the teachings will be realized and attained via the elements and combinations particularly pointed out in the appended claims.

It should be understood that both the foregoing general description and the following detailed description includes examples and are explanatory only, and are not restrictive of the invention as claimed. The accompanying drawings which are incorporated in and constitute part of this specification, illustrate example embodiments of the invention and together with the description, serve to explain principles of the disclosure.

BRIEF DESCRIPTION OF THE DRAWINGS

At least some features and advantages of the present teachings will be apparent from the following detailed description of example embodiments consistent therewith, which description should be considered with reference to the accompanying drawings, wherein:

FIGS. 1A-1C are background illustrations for the purpose of providing terminology and/or axes with respect to a wheeled vehicle.

FIG. 2 illustrates a top schematic view of a vehicle and the concepts of understeer and oversteer relative to an intended or desired driving path.

FIGS. 3A and 3B illustrate example multi-lane highway environments and example time-lapse positions of the wheeled vehicle.

FIG. 9 illustrates an example flow for oversteer/understeer compensation using front/rear load transfer.

FIG. 22) or decreased (e.g., "−"; FIG. 23) via controlled operation of such system.

Figure 4:
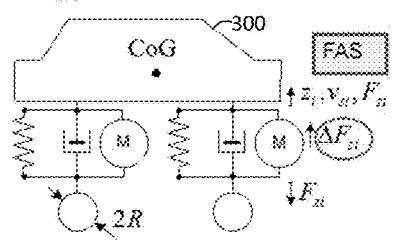
FIG. 4 illustrates an example schematic of one example considered vehicle dynamics configuration.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF EXAMPLE EMBODIMENTS

Reference will now be made in detail to various embodiments, examples of which are illustrated in the accompanying drawings. The various example embodiments are not intended to limit the disclosure. To the contrary, the disclosure is intended to cover alternatives, modifications, and equivalents.

While the present teachings may be described using a four-wheeled motor vehicle as an example, practice of the present disclosure is not limited thereto, i.e., the present disclosure contemplates that the teachings may be practiced with two-wheeled motor vehicles, three-wheeled motor vehicles, etc.

FIGS. 1A-1C are background illustrations for the purpose of disclosing terminology and/or axes with respect to a wheeled vehicle 300, where such terminology and axes may be useable in subsequent descriptions of the invention. Within FIGS. 1A-1C, a (e.g., centrally-located) x-axis 34 extends along a front-and-back longitudinal length of the wheeled vehicle 300, a (e.g., centrally-located) y-axis 33 extends along a side-to-side (orthogonal to the x-axis 34) width of the wheeled vehicle 300, and a (e.g., centrally-located) z-axis 31 extends along a top-and-bottom (orthogonal to the x-axis 34) height of the wheeled vehicle. FIG. 1A's side view illustrates a possible pitch 32 rotational movement of the vehicle, which may be experienced around the y-axis 33. FIG. 1B's top view illustrates possible forward and reverse movements (see straight-line arrows) in same directions as the x-axis 34, and also a possible yaw 35 rotational movement around the vertical z-axis 31. Finally, FIG. 1C's front view illustrates a possible roll 36 rotational movement around x-axis 34, and left and right lateral movements (see straight-line arrows) in same directions as the y-axis 33.

Controller 301 represents a (e.g., hardware processor and programmed memory based) controller which may be provided anywhere within the wheeled vehicle 300, for providing control according to the present invention.

FIG. 2 illustrates a top schematic view of a body main 50 of the vehicle 300, including left-front LF and right-front RF wheels disposed on one or more front axle(s) 52, and left-rear LR and right-rear RR wheels disposed on one or more rear axle(s) 54. Further shown may be a desired steering path (i.e., the driving path intended by the vehicle's driver), an understeer path where the vehicle (e.g., because of lack of front-tire friction, slip, etc.) travels along a more straight path relative to the desired path, and an oversteer path where the vehicle (e.g., because of yaw 35, lack of rear-tire friction, slip, etc.) travels along a more curved path relative to the desired path.

FIGS. 3A and 3B illustrate example multi-lane highway environments having five lanes L1, L2, L3, L4 and L5, and time-lapse positions of the wheeled vehicle 300. Lane L1 may be an on-ramp or entrance lane of the highway. Assume that the vehicle's driver, while traveling at a high speed (e.g., 70 miles per hour (MPH)), intends to undertake a smooth dynamic two-lane change from L1 to L3 as shown in example FIG. 3B.

Irrespective of driver's intention, various situations may occur which may cause the vehicle 300 to instead undertake a non-smooth (i.e., out-of-control) dynamic lane change. For example, assume that the driver may be an inexperienced young driver who attempts too drastic of a lane change as shown illustratively by the FIG. 3A solid arrowed line. That is, the driver turns the steering wheel too sharply, too quickly or too forcefully, in taking the real-time travelling speed into consideration. As shown by FIG. 3A time-lapse positions, the vehicle 300 may first experience an understeer episode (see time-lapse positions framed by the shortest dashed-line bracket) where the vehicle continues to travel more straight than the intended path, and then subsequently experiences oversteer episodes (see time-lapse positions framed by the two longer dashed-line brackets) where the vehicle travels a more curved path than the intended path. In short, the vehicle experiences an out-of-control dynamic handling condition which may be dangerous, in that the vehicle may, for example, hit other vehicles traveling along the highway, and cause personal injuries, deaths and/or personal property (e.g., vehicle) damages.

Next, FIG. 4 illustrates an example schematic of an example considered vehicle dynamics configuration. The FAS actuators, given in a hydraulic, pneumatic or electric (or combination thereof) servomechanism realization, may be placed at each wheel or at each vehicle corner along the passive suspension, in order to provide arrangements for controlling wheel vertical dynamics through, for example, generation of vertical force $\Delta Fzi$, where i=1, . . . , 4 may be the number of wheel (FIG. 4). Within FIG. 4: CoG means center of gravity; M: active suspension actuator; z: suspension travel—every suspension has a limited travel. Therefore, active suspension can only apply a force ($\Delta Fz$) until travel limit is reached; v: suspension travel velocity; R: tire rolling radius; Fz: tire load (or vertical tire force); and A means change.

The vehicle may be equipped with different vehicle dynamics sensors such as steering wheel angle, wheel speed, yaw rate and side-slip angle sensors, as well as one or more cameras that can provide a preview of a road being traveled to enable predictive control based upon upcoming road characteristics. The vehicle may also contain an electronic control unit, which acquires the sensor information and camera images, and which commands FAS force inputs. The vehicle may be equipped with other vehicle dynamics actuators. Attention is directed to US 2005/0206231 A1 which discloses additional sensor, camera, etc., arrangements, the teachings of which are incorporated herein by reference.

Figure 5:
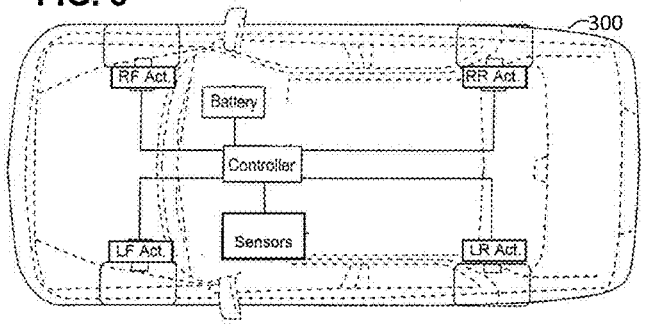
FIG. 5 illustrates an example top view schematic illustrating actuator assemblies positioned relative to each wheel.

Continuing, FIG. 5 illustrates an example top view schematic illustrating actuator assemblies positioned relative to each wheel, i.e., there may be a left-front actuator (LF Act.) assembly providing actuation with respect to a LF wheel position, a right-front actuator (RF Act.) assembly providing actuation with respect to a RF wheel position, a left-rear actuator (LR Act.) assembly providing actuation with respect to a LR wheel position, and a right-rear actuator (RR Act.) assembly providing actuation with respect to a RR wheel position, respectively. The invention may also be practiced with a fewer number of actuator assemblies than there are wheels. Each actuator assembly may include a plurality of (e.g., electric, pneumatic, hydraulic, or hybrid combination, etc.) actuators which may respectively control (in real-time) differing operational aspects of the associated wheel position. For example: a first actuator may vary an up-and-down height of the vehicle main body relative to the wheel so as to vary a normal force applied between the tire and the road; a second actuator may vary a toe angle of the wheel to have the wheel point more inward or outward relative to the x-axis; and a third actuator may vary a camber angle of the wheel to have the wheel tilted leaning to the left or right relative to the Z-axis. The actuators may be controlled by an FAS controller (which may be hardware processor based) connected to sensors and a power source (e.g., battery).

Figure 6A:
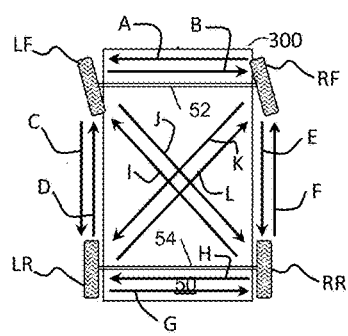
FIGS. 6A-6E are used to illustrate various possibilities of normal force change of the LF, RF, LR and RR wheels.

FIG. 6A is used to illustrate various possibilities of a first type of normal force change which may be implemented with the arrangement of the invention. More particularly, solid arrows A-L are used to illustrate each possible normal force transfer from a normal force donating wheel (tail of the arrow in FIG.) to a normal force receiving wheel (at arrowed end). A complete amount of the normal force, or only a smaller amount of the normal force, may be transferred between two subject wheels, dependent upon the degree of actuation of the respective actuator assemblies. Further, not all transfer possibilities may be used for each given control episode or operation. For example, if the actuator assemblies associated with the RF, LR and RR wheels each increase a height of the vehicle body relative to the RF, LR and RR wheels, then normal force may be transferred from each of the RF, LR and RR wheels over to the LF wheel, which would be shown representatively by only the A, D and I arrows, respectively, i.e., normal force would not be transferred via any of the representative arrows B, C, E-H or J-L in this example control operation.

Figure 6B:
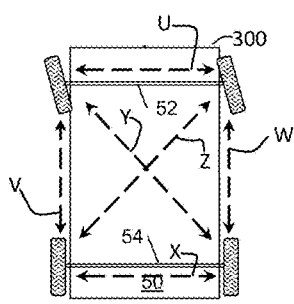

Similarly, FIG. 6B is used to illustrate a second type of possibilities, i.e., balancing of normal forces between various pairs of the LF, RF, LR and RR wheels. More particularly, dashed double-headed arrows U-Z are used to illustrate each possible normal force balancing between a normal force donating wheel and a normal force receiving wheel. Not all possibilities may be used for each given control episode or operation. For example, if the actuator assemblies associated with the RF and LR wheels were given suitable inputs or commands to balance the normal forces of these two wheels, then normal force may be transferred from one or the other of the RF and LR wheel over to the remaining RF and LR wheel, as shown representatively by the double-headed dashed arrow Z, i.e., normal force would not be transferred via any of the remaining double headed arrows U-Y in this example control operation.

As another type of possibility, when the tire lateral forces are saturated, the FAS system may temporarily increase (illustrated representatively by the FIG. 6D "+" signs M-P adjacent each wheel) the total tire load of one or more (e.g., all) tires, thus boosting the total lateral force and lateral acceleration. Lateral force acts on a car sideways to the direction of travel, and may generate lateral acceleration. Such may be noticeable as a lateral (or centrifugal) force moving a car to the outside of a curve when cornering, for example.

Figure 21:
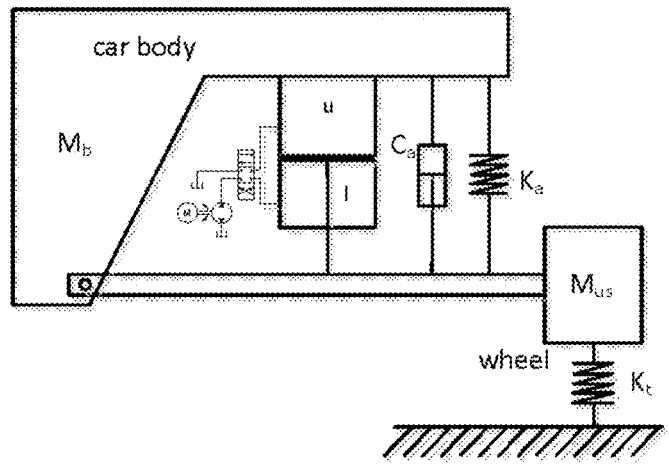
FIGS. 21-23 illustrate an example representative hydraulic active suspension system, which is useful in explanation of how tire forces may be increased (e.g., "+"

FIG. 21 illustrates an example representative hydraulic active suspension system, which is useful in explanation of how tire forces may be increased (e.g., "+") or decreased (e.g., "−") via controlled operation of such system. Within FIG. 21, items are defined as follows: Ca: suspension damping coefficient; Ka: suspension spring constant; Kt: tire spring constant; Mb: mass of vehicle body (one corner); Mus: mass of wheel assembly (one corner); u: upper cylinder of the active suspension actuator; l: lower cylinder of the active suspension actuator.

Figure 22:
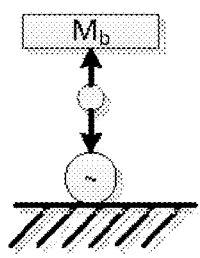

When fluid is supplied (e.g., via a hydraulic fluid pump) to the upper cylinder u, a force is generated to push up (see FIG. 22 up "↑" arrow) the vehicle body and push down (see FIG. 22 down "↓" the wheel. This action increases the individual tire load temporarily (and is equivalent to increasing tire-road friction coefficient). When all four wheels are pushed down (e.g., via controlling the hydraulic fluid pump to apply a burst or pulsating bursts of the hydraulic fluid to the upper cylinder u), the total tire load may be (e.g., temporarily) increased.

Still further, the FAS system may temporarily decrease (illustrated representatively by the FIG. 6E "−" signs Q-T adjacent each wheel) the total tire load of one or more (e.g., all) tires, thus lessening the total lateral force and lateral acceleration.

Figure 23:
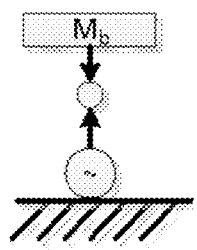

That is, in contrast, when fluid is supplied to the FIG. 21 lower cylinder l, a force is generated to pull down (see FIG. 23 down "↓" arrow) the vehicle body and lift up (see FIG. 23 up "↑" arrow) the wheel. This action reduces the individual tire load temporarily (and is equivalent to reducing tire-road friction coefficient). When all four wheels are lifted up (e.g., via controlling the hydraulic fluid pump to apply a burst or pulsating bursts of the hydraulic fluid to the lower cylinder l), the total tire load may be (e.g., temporarily) decreased.

Figure 6C:
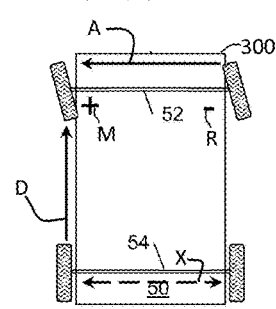
Figure 6D:
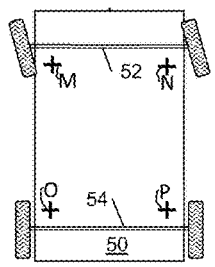
Figure 6E:
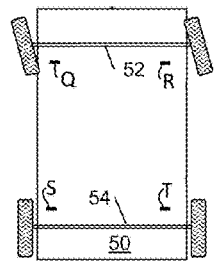

The transfer of normal forces, the balancing of normal forces and the temporary increase or decrease of total tire load, are not mutually exclusive, i.e., they may be mixedly applied in a given control episode or operation. For example, FIG. 6C shows one example where: normal force is transferred (as shown representatively by the solid arrow A) from the RF wheel to the LF wheel; normal force is transferred (as shown representatively by the solid arrow D) from the LR wheel to the LF wheel; remaining normal forces in the LR and RR wheels are balanced (as shown representatively by the double-headed dashed arrow X), and temporary normal forces are further increased (see "+" symbol M) to the LF wheel and further decreased (see "−" symbol R) to the RF wheel.

Figure 7:
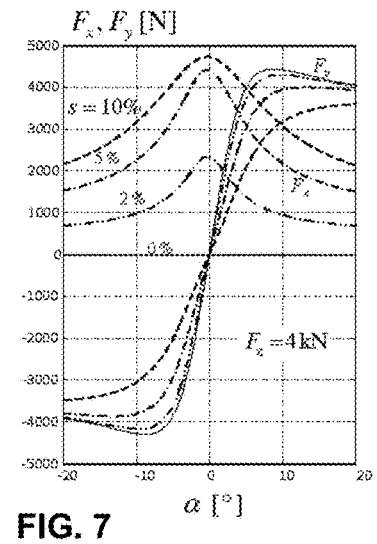
FIGS. 7 and 8 show example Illustrations of FAS control authority based on tire static curves.
Figure 8:
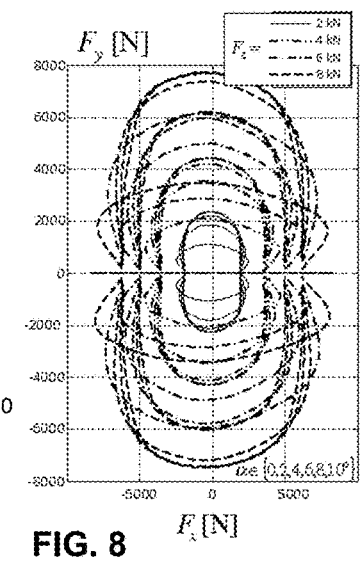

Next, FIGS. 7 and 8 show an example Illustration of FAS control authority based on tire static curves. Regarding such FIGS: Fx: longitudinal tire force—helps vehicle accelerate or slow down; Fy: lateral tire force—helps vehicle turn; s: longitudinal tire slip—a spinning wheel or a locked wheel has large longitudinal tire slip; α: tire slip angle—is the angle between a rolling wheel's actual direction of travel and the direction towards which it is pointing. A tire can only provide limited horizontal force (combination of Fx and Fy). In general, the higher the tire load (Fz), the larger the horizontal force it can provide. Thus, one can use active suspension to control Fz to influence Fx and Fy. Further to the above: Fx is a function of longitudinal tire slip s (FIG. 7); Fy is a function of tire slip angle α (FIG. 7). If a tire is providing small Fx, then it can provide large Fy. But if a tire is providing large Fx, then it can only provide small Fy (FIG. 7 and FIG. 8), since the total horizontal force is limited; and vice versa.

Continuing, regarding FAS control authority, examples of the invention may be based on the following control authority mechanisms of FAS actuators over the generation of tire lateral forces, and thus over the vehicle handling dynamics, as follows:

1) Referring to FIGS. 7 and 8, the FAS actuators can influence the lateral force Fy of each tire by changing, for example, the tire load Fz through the actuator force ΔFzi. By transferring the load, for example, to the front LF and RF tires, the FAS system may be used to emphasize the front axle lateral forces over the rear ones, thus generating oversteer yaw torque (i.e. compensating for understeer behavior). Such rear-to-front load transfer may be illustrated representatively by the FIG. 6A's solid arrows D, F, I and L. And vice versa, transferring the load to rear LR and RR tires may be used to generate understeer torque, i.e., to compensate for oversteer behavior. Such front-to-rear load transfer may be illustrated representatively by the FIG. 6A's solid arrows C, E, J and K.

2) For the critical parts of maneuvers when the tire lateral forces may be saturated, the FAS system can temporarily increase the total tire load, thus boosting the total lateral force and lateral acceleration. This improves the handling performance in terms of reducing the turning radius, i.e. compensating for the terminal understeer behavior. The action may be similar as a "virtual" increase of tire-road friction coefficient.

3) For the throttle-on maneuvers, when the front, rear, or all tires transfer longitudinal force, the FAS system can unload a driven tire to increase its longitudinal slip η and reduce its lateral force $F_y$ (see the tire static curves in FIGS. 7-8). The FAS would typically unload the tire with an already low load, i.e. the inner tire. For example, with the turning illustrated in FIG. 6A, the inner LF tire may be unloaded, i.e., normal force on the LF tire may be unloaded as shown representatively by the FIG. 6A arrows B, C, and J. The lateral force reduction for a rear wheel drive (RWD)/all-wheel drive (AWD) vehicle leads, for example, to oversteer torque generation, while in the case of front wheel drive (FWD)/AWD, the understeer torque will be generated.

Figure 24:
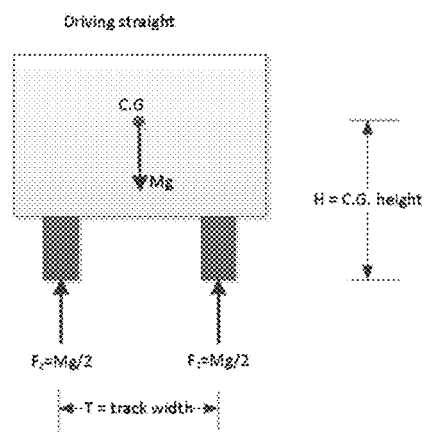
FIGS. 24 and 25 illustrate example representative views of differing steering conditions of a passive vehicle, which views are useful in illustrating how outer tire loads may be larger than inner tire loads.
Figure 25:
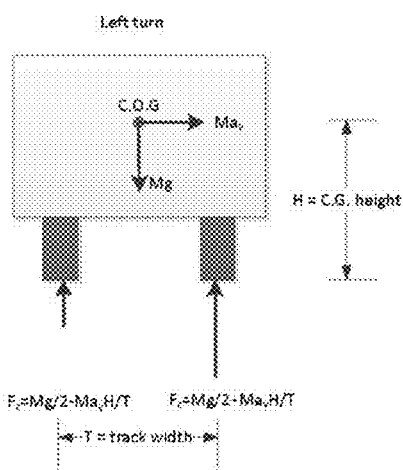

4) A passive vehicle behavior of the vehicle may be such that the outer tire loads may be larger than the inner tire loads. FIGS. 24 and 25 representative views are useful in illustrating such load differences. More particularly, FIGS. 24 and 25 illustrate representative views of a passive vehicle with conventional suspension (spring and damper) and with no active suspension. In driving forward in a straight direction as shown in FIG. 24, the loads provided on side-to-side tires are substantially equal to one another. In contrast, in turning left as shown in FIG. 25, a load/weight transfer occurs due to lateral acceleration applied to a vehicle body (not due to passenger's weight).

Figure 13:
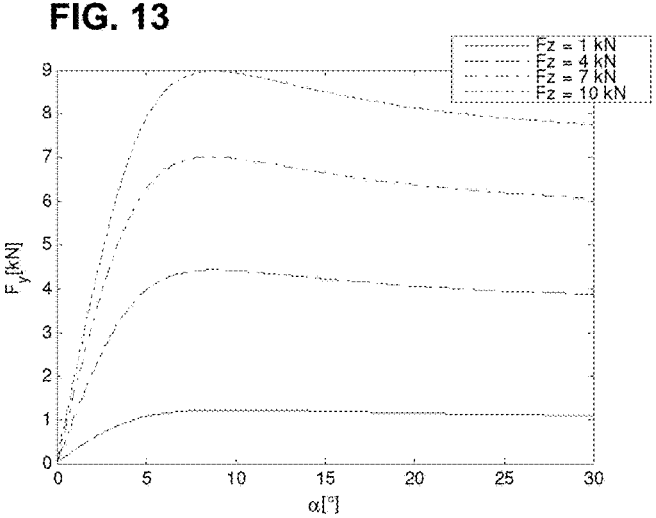
FIGS. 13-14 illustrate an example of FAS control authority based on convexity of an Fy(Fz) tire static curve.
Figure 14:
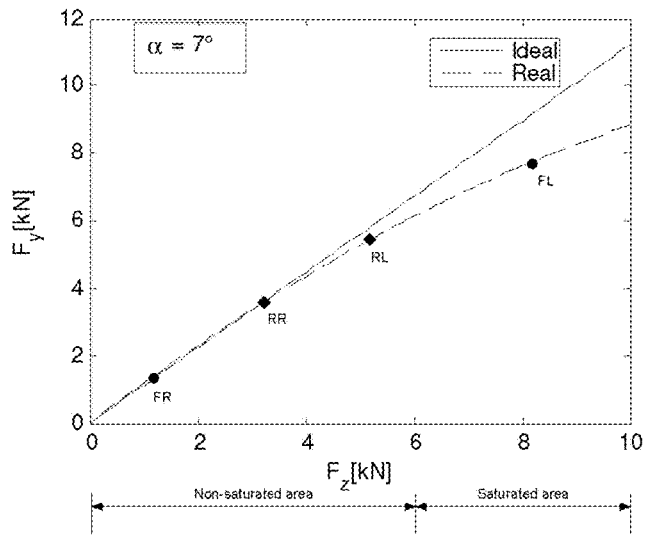

Due to the convexity of tire lateral force vs. normal load static curve (FIG. 14), an axle with a large difference between the outer-inner tire loads would loosen some lateral force. More particularly, FIGS. 13-14 illustrate an example of FAS control authority based on convexity of an Fy(Fz) tire static curve. FIGS. 13, 14 symbols are as defined elsewhere in this disclosure.

Regarding FIG. 13's plots, in general, the higher the tire load (Fz), the larger the lateral force (Fy) it can generate. Further, in FIG. 13, Fy is a function of tire slip angle α. In general, the higher the slip angle α, the larger lateral force (Fy) the tire generates. In FIG. 13, when α is small (e.g., less than 5 deg), Fy increases linearly with α. But as α gets larger, Fy cannot keep increasing, instead it is saturated.

Regarding FIG. 14, for a fixed α, Fy is a function of Fz. Fy increases linearly as Fz increase, before it starts to saturate. Further, in FIG. 14, by changing the tire load (Fz) of each corner, active suspension can influence the lateral tire force (Fy) of each corner, and therefore affect the vehicle handling accordingly.

The FAS system can generate a side tire load transfer, so that for instance the front tire loads may be better balanced (FIG. 6B's arrow U) while the rear tire load difference may be increased (FIG. 6A's arrow H), thus resulting in oversteer torque generation. And vice versa, if the rear tire loads may be more balanced (FIG. 6B's arrow X) and the front tire load difference may be increased (FIG. 6A's arrow A), understeer torque may be generated.

5) The FAS system has a direct control authority over the roll motion, through which it can influence the tire camber angle and the toe angle, and thus the tire lateral force. For the passive vehicle, which may be inclined (in roll sense) towards the outer wheels during a turn, the camber and toe effects may be usually tuned in such way that they contribute to oversteer compensation. The FAS system can, however, keep the vehicle roll angle at zero, or to have an opposite roll than in the passive case (tilting effect). The FAS can then use zero-roll angle or tilting control for the sake of understeer compensation, and revert to passive vehicle-like roll when the vehicle stability may be compromised.

The following example flows are provided so as to enhance an understanding of the FAS-based vehicle dynamics control system arrangements of the invention. While the flows are illustrated and described separately, practice of the invention are not limited to separate practice. That is, practice of the invention may include plural flows conducted serially or in parallel, although some adjustments may be required.

FAS System Control, for Example, by Utilizing Front/Rear Load Transfer:

By transferring the load to front tires (FIG. 6A's solid arrows D, F, I and L), the FAS system may emphasize the front axle lateral forces over the rear ones, thus generating oversteer yaw torque (i.e. compensating for understeer behavior). And vice versa, transferring the load to rear tires (FIG. 6A's solid arrows C, E, J and K) generates understeer torque, i.e. compensate for oversteer behavior.

FIG. 9 illustrates an example flow 900 of an FAS system control utilizing front/rear load transfer. After START 902, there may be DRIVER INPUT and VEHICLE DATA PATH PREVIEW 904 (e.g., via camera image(s); map data, etc.). Next, there may be ESTIMATION of VEHICLE STATES and DESIRED VEHICLE MOTION 906. At flow operation 908, a VEHICLE UNDERSTEER inquiry is made. If YES (understeer is present), the flow operation 910 DETERMINES UNDERSTEER COMPENSATION TORQUE TO ACHIEVE TARGET MOTION, OR TO FOLLOW A TARGET PATH, followed by flow operation 912 which DETERMINES DESIRED FRONT/REAR LATERAL TIRE FORCE, and then flow operation 914 which DETERMINES DESIRED NORMAL TIRE FORCES. At flow operation 916, there is a COMMAND OF FAS TO INCREASE FRONT TIRE NORMAL FORCES AND REDUCE REAR TIRE NORMAL FORCES, TO GENERATE THE UNDERSTEER COMPENSATION TORQUE. In contrast, if flow operation 908's determination is NO (understeer is not present), then at flow operation 930, a VEHICLE OVERSTEER inquiry is made. If YES (oversteer is present), the flow operation 932 DETERMINES OVERSTEER COMPENSATION TORQUE TO ACHIEVE TARGET MOTION, OR TO FOLLOW A TARGET PATH, followed by flow operation 934 which DETERMINES DESIRED FRONT/REAR LATERAL TIRE FORCE, and then flow operation 936 DETERMINES DESIRED NORMAL TIRE FORCES. At flow operation 938, there is a COMMAND OF FAS TO INCREASE REAR TIRE NORMAL FORCES AND REDUCE FRONT TIRE NORMAL FORCES, TO GENERATE THE OVERSTEER COMPENSATION TORQUE. In contrast, if flow operation 930's determination is NO (oversteer is not present), then at flow operation 960, the flow RESETS FAS COMMANDS TO ZERO. At flow operation 990, the FIG. 9 flow operations END.

FAS System Control, for Example, by Increasing Total Tire Loads:

For critical maneuvers when the tire lateral forces may be saturated, the FAS system may temporarily increase (illustrated representatively by the FIG. 6C "+" signs adjacent each wheel) the total tire load, thus boosting the total lateral force and lateral acceleration. This improves the handling performance in terms of reducing the turning radius, i.e. compensating for the terminal understeer behavior. The action may be similar as a "virtual" increase of tire-road friction coefficient.

Figure 10:
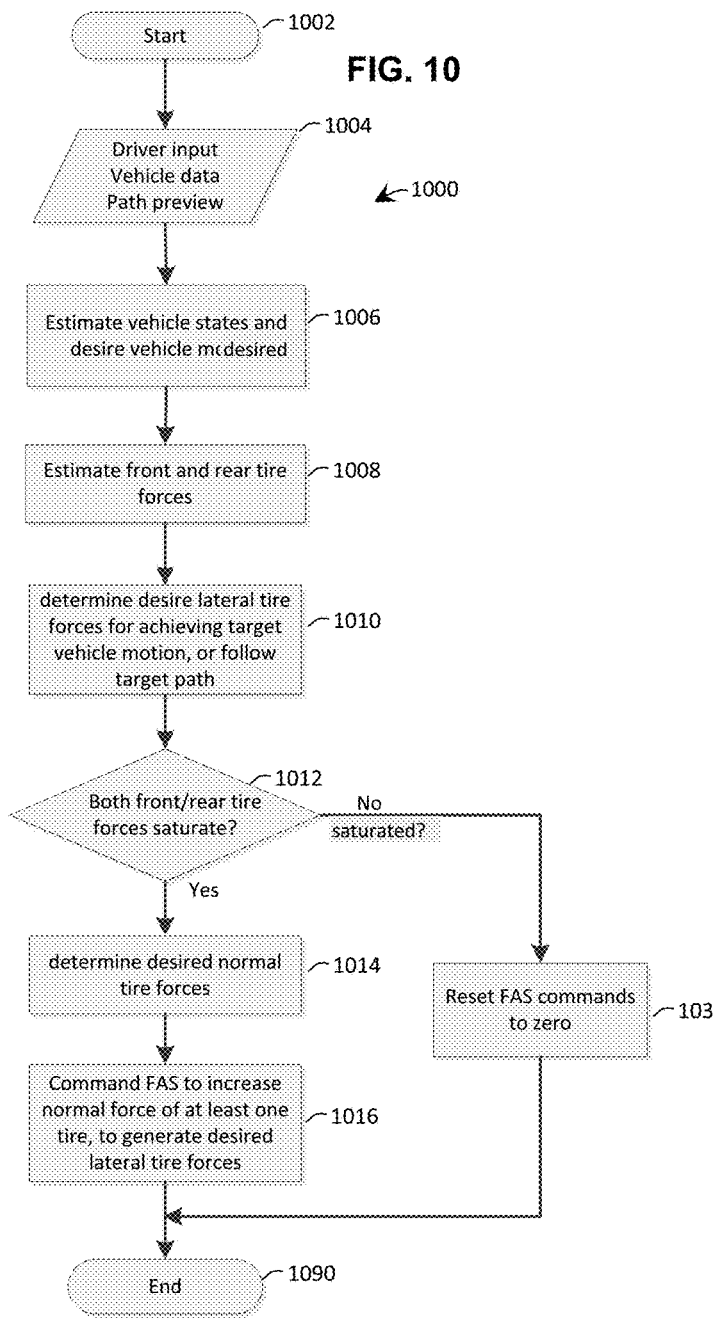
FIG. 10 illustrates an example for lateral tire force boosting by increasing normal force of all tires.

FIG. 10 illustrates an example flow 1000 of an FAS system control utilizing increased total tire loads. After START 1002, there may be DRIVER INPUT and VEHICLE DATA PATH PREVIEW 1004 (e.g., via camera image(s); map data, etc.). Next, there may be ESTIMATION of VEHICLE STATES and DESIRED VEHICLE MOTION 1006, and then flow operation 1008 operation ESTIMATES FRONT AND REAR TIRE FORCES. Continuing, the flow operation 1010 DETERMINES DESIRED LATERAL TIRE FORCES FOR ACHIEVING TARGET VEHICLE MOTION, OR TO FOLLOW A TARGET PATH. At flow operation 1012, a BOTH FRONT/REAR TIRE FORCES SATURATED inquiry is made. If YES (saturation is present), then flow operation 1014 DETERMINES DESIRED NORMAL TIRE FORCES. At flow operation 1016, there is a COMMAND OF FAS TO INCREASE NORMAL FORCE OF AT LEAST ONE TIRE, TO GENERATE DESIRED LATERAL TIRE FORCES. In contrast, if flow operation 1012's determination is NO (saturation is not present), then at flow operation 1030, the flow RESETS FAS COMMANDS TO ZERO. At flow operation 1090, the FIG. 10 flow operations END.

FAS System Control, for Example, by Reducing Normal Force of Driven Wheels:

For throttle-on maneuvers, the FAS system may compensate for understeer/oversteer by, for example, reducing the normal forces on the driven wheels (preferably the inner ones) to the extent at which a controllable (limited) excursion of the longitudinal slip may be achieved. This control action effectively reduces driven axle lateral forces, thus enabling oversteer/understeer torque generation.

Figure 11:
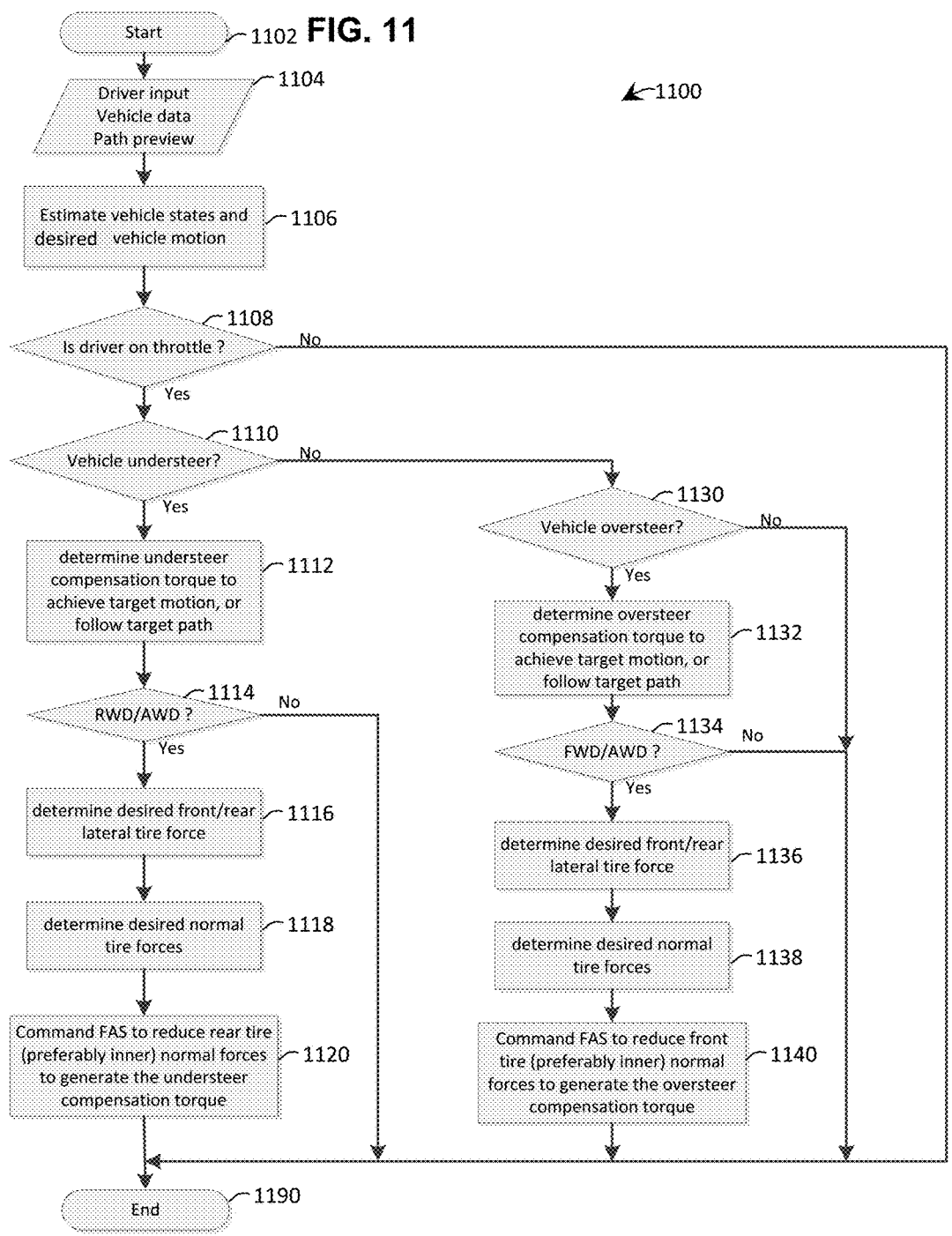
FIG. 11 illustrates an example flow for oversteer/understeer compensation by reducing normal force of driven wheels.

FIG. 11 illustrates an example flow 1100 of an FAS system control utilizing a reduction of normal force of driven wheels. After START 1102, there may be DRIVER INPUT and VEHICLE DATA PATH PREVIEW 1104 (e.g., via camera image(s); map data, etc.). Next, there may be ESTIMATION of VEHICLE STATES and DESIRED VEHICLE MOTION 1106. At flow operation 1108, an IS DRIVER ON THROTTLE inquiry is made. If YES (throttle is on), the flow operation 1110 makes a VEHICLE UNDERSTEER inquiry. If YES (understeer is present), the flow operation 1112 DETERMINES UNDERSTEER COMPENSATION TORQUE TO ACHIEVE TARGET MOTION, OR TO FOLLOW A TARGET PATH. At flow operation 1114, a RWD/AWD inquiry is made. If YES (RWD/AWD is present), the flow operation 1116 DETERMINES DESIRED FRONT/REAR LATERAL TIRE FORCE, and then flow operation 1118 DETERMINES DESIRED NORMAL TIRE FORCES. At flow operation 1120, there is a COMMAND OF FAS TO REDUCE REAR TIRE (PREFERABLY INNER) NORMAL FORCES TO GENERATE THE UNDERSTEER COMPENSATION TORQUE.

In contrast, if flow operation 1114's determination is NO (RWD/AWD is not present), the flow proceeds directly to END 1190.

Still further, if flow operation 1110's determination is NO (understeer is not present), then at flow operation 1130, a VEHICLE OVERSTEER inquiry is made. If YES (oversteer is present), the flow operation 1132 DETERMINES OVERSTEER COMPENSATION TORQUE TO ACHIEVE TARGET MOTION, OR TO FOLLOW A TARGET PATH. At flow operation 1134, a FWD/AWD inquiry is made. If YES (FWD/AWD is present), the flow operation 1136 DETERMINES DESIRED FRONT/REAR LATERAL TIRE FORCE, and then flow operation 1138 DETERMINES DESIRED NORMAL TIRE FORCES. At flow operation 1140, there is a COMMAND OF FAS TO REDUCE FRONT TIRE (PREFERABLY INNER) NORMAL FORCES TO GENERATE THE OVERSTEER COMPENSATION TORQUE.

In contrast to the above, if any of: flow operation 1134's determination is NO (RWD/AWD is not present), flow operation 1130's determination is NO (oversteer is not present), or flow operation 1108's determination is NO (driver is not on throttle), the flow proceeds directly to the END 1190.

Suspension Travel Planning Using, for Example, Path Preview:

The control authority of FAS system may be limited by the amount of available suspension travel. That is, once the suspension reaches the end of travel (i.e., rebound/jounce limits), it can no longer exert the required normal force on a tire. With path preview information (e.g., camera image(s); map data, etc.), the controller can pre-determine maximum allowed suspension travel along the previewed path, and implement control of the actuator assembly accordingly so that the actuator assembly does not run out of travel when control may be most needed.

Figure 12:
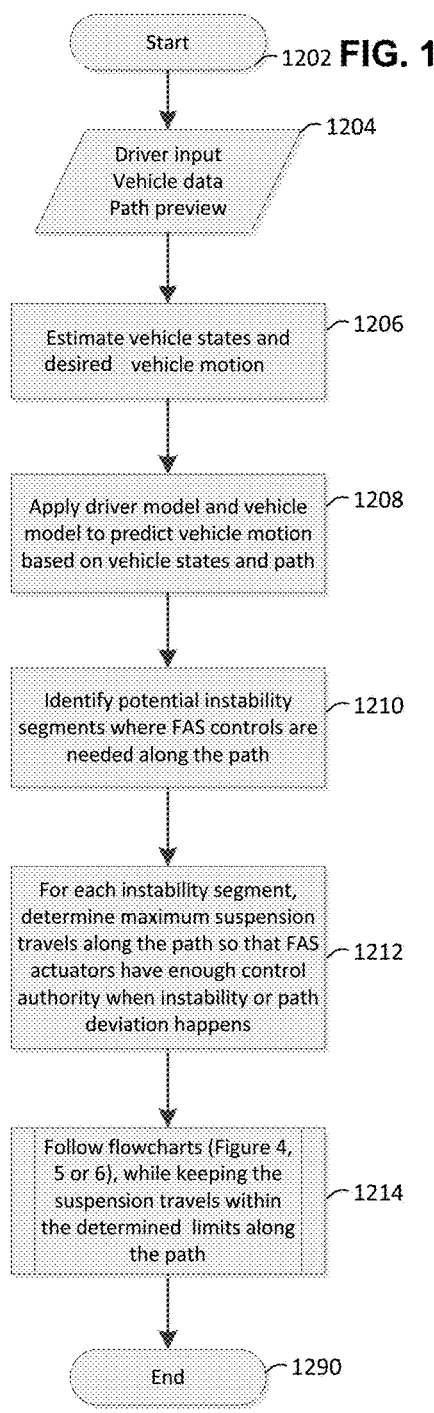
FIG. 12 illustrates an example flow for suspension travel planning with path preview.

FIG. 12 illustrates an example flow 1200 of an FAS system control utilizing suspension travel planning using path preview. After START 1202, there may be DRIVER INPUT and VEHICLE DATA PATH PREVIEW 1204 (e.g., via camera image(s); map data, etc.). Next, there may be ESTIMATION of VEHICLE STATES and DESIRED VEHICLE MOTION 1206. At flow operation 1208, the operation may APPLY DRIVER MODEL AND VEHICLE MODEL TO PREDICT VEHICLE MOTION BASED ON VEHICLE STATES AND PATH. At flow operation 1210, the operation may IDENTIFY POTENTIAL INSTABILITY SEGMENTS WHERE FAS CONTROLS ARE NEEDED ALONG THE PATH. At flow operation 1212, the operation may operate so as FOR EACH INSTABILITY SEGMENT, DETERMINE MAXIMUM SUSPENSION TRAVELS ALONG THE PATH SO THAT FAS ACTUATORS HAVE ENOUGH CONTROL AUTHORITY WHEN INSTABILITY OR PATH DEVIATION HAPPENS. Next, at flow operation 1214, the operation FOLLOWS FLOWCHARTS (FIG. 9, 10 or 11), WHILE KEEPING THE SUSPENSION TRAVELS WITHIN THE DETERMINED LIMITS ALONG THE PATH. At flow operation 1290, the FIG. 12 flow operations END.

FAS System Control by Utilizing, for Example, Diagonal Weight Transfer:

For certain maneuvers, the controller may require sustained oversteer/understeer compensation, which cannot be delivered by the control mechanisms described in FIGS. 9-11, due to suspension travel limit. These mechanisms may also (in some maneuvers) be ineffective due to limited actuator bandwidth.

In these cases, a different control mechanism may be employed. For oversteer compensation, the controller may transfer the vehicle weight to the outer front/inner rear diagonal (e.g., by jacking up the inner rear corner). This will reduce the front axle lateral force by increasing the difference between the outer and inner tire normal loads, and thus, exploiting the abovementioned tire load vs. lateral force static curve convexity (FIGS. 13-14). At the same time, the rear axle tire load may be made more balanced to boost the lateral force. Similarly, for understeer compensation, the controller may transfer the vehicle weight to the inner front/outer rear diagonal (e.g., by jacking up the outer rear corner). An example controller flowchart may be described via FIG. 15.

Figure 15:
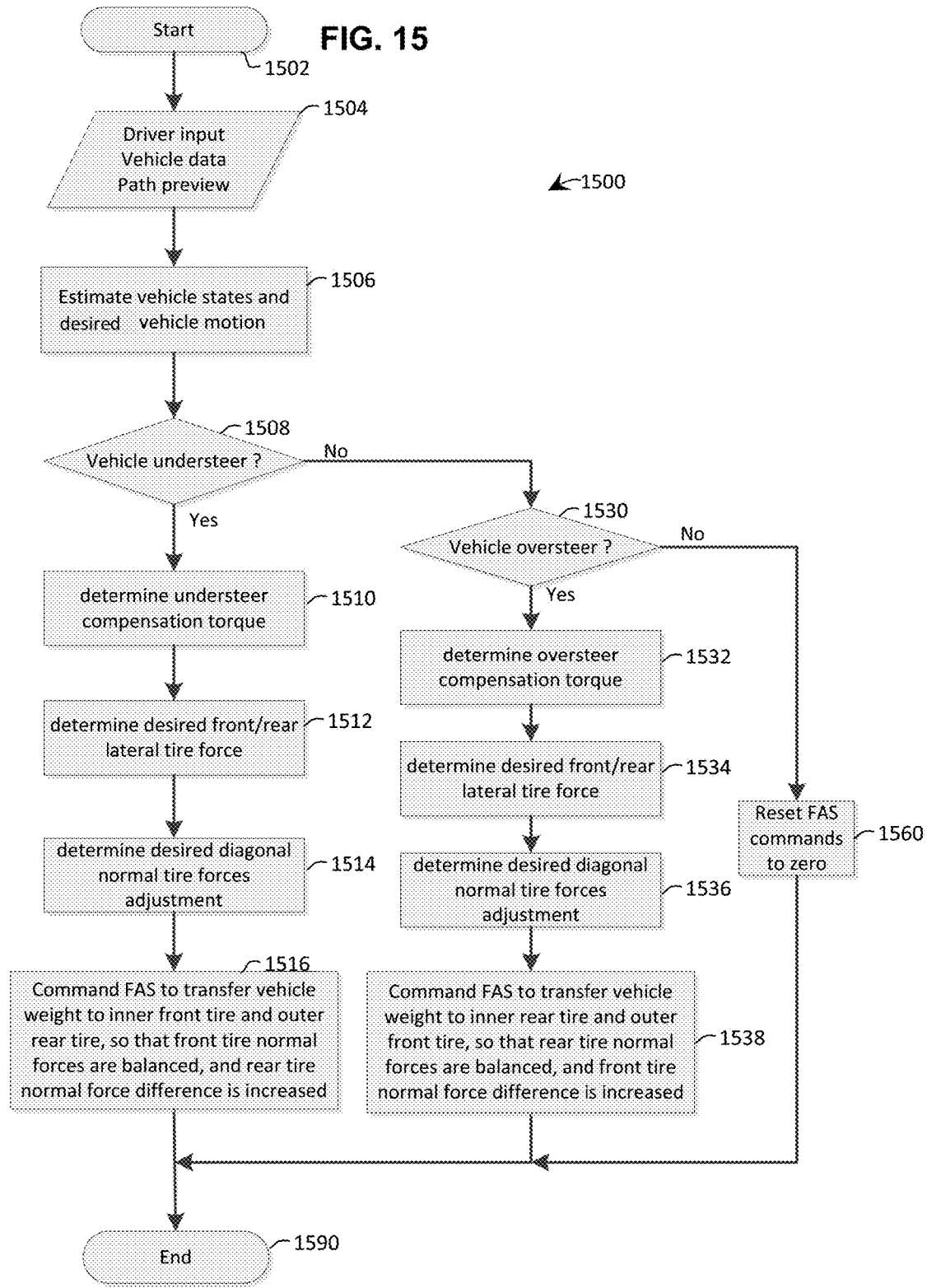
FIG. 15 illustrates an example flow of an FAS system control utilizing oversteer/understeer compensation using diagonal weight transfer.

More particularly, FIG. 15 illustrates an example flow 1500 of an FAS system control utilizing oversteer/understeer compensation using diagonal weight transfer. After START 1502, there may be DRIVER INPUT and VEHICLE DATA PATH PREVIEW 1504 (e.g., via camera image(s); map data, etc.). Next, there may be ESTIMATION of VEHICLE STATES and DESIRED VEHICLE MOTION 1506. At flow operation 1508, a VEHICLE UNDERSTEER inquiry is made. If YES (understeer is present), the flow operation 1510 DETERMINES UNDERSTEER COMPENSATION TORQUE, followed by flow operation 1512 which DETERMINES DESIRED FRONT/REAR LATERAL TIRE FORCE, and further, flow operation 1514 which DETERMINES DESIRED DIAGONAL NORMAL TIRE FORCES ADJUSTMENT. At flow operation 1516, there is a COMMAND OF FAS TO TRANSFER VEHICLE WEIGHT TO INNER FRONT TIRE AND OUTER REAR TIRE, SO THAT FRONT TIRE NORMAL FORCES ARE BALANCED, AND REAR TIRE NORMAL FORCE DIFFERENCE IS INCREASED.

In contrast, if flow operation 1508's determination is NO (understeer is not present), then at flow operation 1530, a VEHICLE OVERSTEER inquiry is made. If YES (oversteer is present), the flow operation 1532 DETERMINES OVERSTEER COMPENSATION TORQUE, followed by flow operation 1534 which DETERMINES DESIRED FRONT/REAR LATERAL TIRE FORCE, and then flow operation 1536 which DETERMINES DESIRED DIAGONAL NORMAL TIRE FORCES ADJUSTMENT. At flow operation 1538, there is a COMMAND OF FAS TO TRANSFER VEHICLE WEIGHT TO INNER REAR TIRE AND OUTER FRONT TIRE, SO THAT REAR TIRE NORMAL FORCES ARE BALANCED, AND FRONT TIRE NORMAL FORCE DIFFERENCE IS INCREASED.

In contrast, if flow operation 1530's determination is NO (oversteer is not present), then at flow operation 1560, the flow RESETS FAS COMMANDS TO ZERO. At flow operation 1590, the FIG. 15 flow operations END.

Regarding another arrangement, when the vehicle path may be previewed (e.g., via a camera image, map data, etc.), the controller may be constructed or programmed to further utilize the vehicle model to predict whether vehicle will become unstable along the path or deviate from the intended path, and to activate a handling stability mechanism preemptively. The predictive controller flowchart may be described via FIG. 16.

Figure 16:
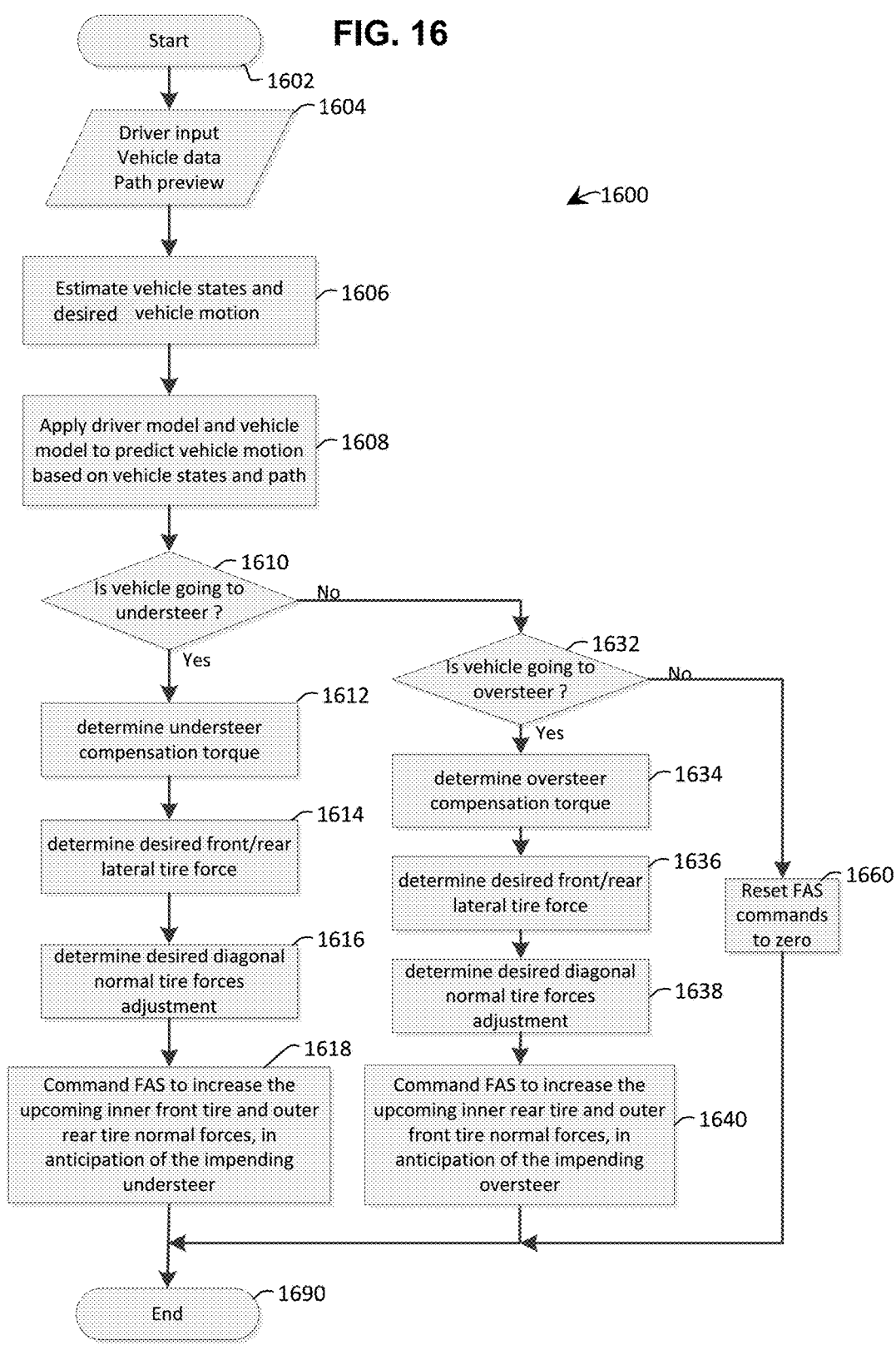
FIG. 16 illustrates an example flow of an FAS system control utilizing oversteer/understeer compensation using diagonal weight transfer (with path preview).

More particularly, FIG. 16 illustrates an example flow 1600 of an FAS system control utilizing oversteer/understeer compensation using diagonal weight transfer (with path preview). After START 1602, there may be DRIVER INPUT and VEHICLE DATA PATH PREVIEW 1604 (e.g., via camera image(s); map data, etc.). Next, there may be ESTIMATION of VEHICLE STATES and DESIRED VEHICLE MOTION 1606. At flow operation 1608, the operations may utilize the path preview and APPLY DRIVER MODEL AND VEHICLE MODEL TO PREDICT VEHICLE MOTION BASED ON VEHICLE STATES AND PATH. At flow operation 1610, an IS VEHICLE GOING TO UNDERSTEER inquiry is made. If YES (understeer is predicted), the flow operation 1612 DETERMINES UNDERSTEER COMPENSATION TORQUE, followed by flow operation 1614 which DETERMINES DESIRED FRONT/REAR LATERAL TIRE FORCE, and then flow operation 1616 DETERMINES DESIRED DIAGONAL NORMAL TIRE FORCES ADJUSTMENT. At flow operation 1618, there is a COMMAND OF FAS TO INCREASE THE UPCOMING INNER FRONT TIRE AND OUTER REAR TIRE NORMAL FORCES, IN ANTICIPATION OF THE IMPENDING UNDERSTEER.

In contrast, if flow operation 1610's determination is NO (understeer is not predicted), then at flow operation 1632, an IS VEHICLE GOING TO OVERSTEER inquiry is made. If YES (oversteer is predicted), the flow operation 1634 DETERMINES OVERSTEER COMPENSATION TORQUE, followed by flow operation 1636 which DETERMINES DESIRED FRONT/REAR LATERAL TIRE FORCE, and then flow operation 1638 DETERMINES DESIRED DIAGONAL NORMAL TIRE FORCES ADJUSTMENT. At flow operation 1640, there is a COMMAND OF FAS TO INCREASE THE UPCOMING INNER REAR TIRE AND OUTER FRONT TIRE NORMAL FORCES, IN ANTICIPATION OF THE IMPENDING OVERSTEER.

In contrast, if flow operation 1632's determination is NO (oversteer is not predicted), then at flow operation 1660, the flow RESETS FAS COMMANDS TO ZERO. At flow operation 1690, the FIG. 16 flow operations END.

FAS System Control by Adjusting, for Example, Front/Rear Roll Stiffness:

For certain maneuvers, the controller may require sustained oversteer/understeer compensation, which cannot be delivered by the control mechanisms described in FIGS. 9-11, due to suspension travel limit. These mechanisms can also be ineffective (in some maneuvers) due to limited actuator bandwidth.

In these cases, another control mechanism may be employed. That is, for oversteer compensation, the controller may stiffen the vehicle front suspension. This will reduce the front axle lateral force by increasing the difference between the outer and inner tire normal loads, and thus, exploiting the abovementioned tire load vs. lateral force static curve convexity (FIGS. 13-14). At the same time, the rear suspension may be loosened to boost the lateral force. Similarly, for understeer compensation, the controller may loosen the front suspension and stiffen the front suspension. The controller flowchart may be described via FIG. 17.

Figure 17:
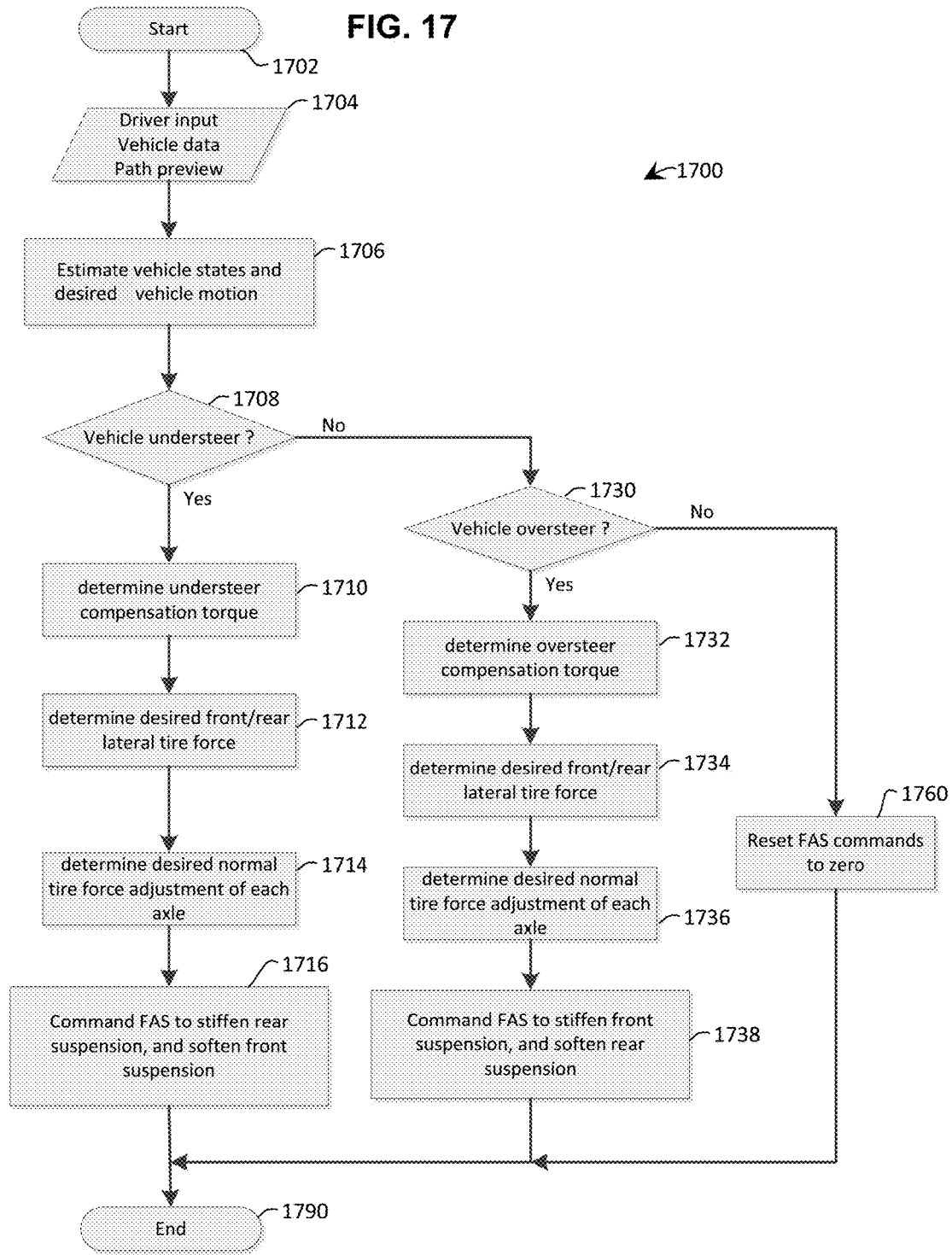
FIG. 17 illustrates an example flow of an oversteer/understeer compensation by adjusting front/rear roll stiffness.

FIG. 17 illustrates an example flow 1700 of an oversteer/understeer compensation by adjusting front/rear roll stiffness. After START 1702, there may be DRIVER INPUT and VEHICLE DATA PATH PREVIEW 1704 (e.g., via camera image(s); map data, etc.). Next, there may be ESTIMATION of VEHICLE STATES and DESIRED VEHICLE MOTION 1706. At flow operation 1708, a VEHICLE UNDERSTEER inquiry is made. If YES (understeer is present), the flow operation 1710 DETERMINES UNDERSTEER COMPENSATION TORQUE, followed by flow operation 1712 which DETERMINES DESIRED FRONT/REAR LATERAL TIRE FORCE, and then flow operation 1714 which DETERMINES DESIRED NORMAL TIRE FORCE ADJUSTMENT OF EACH AXLE. At flow operation 1716, there is a COMMAND OF FAS TO STIFFEN REAR SUSPENSION, AND SOFTEN FRONT SUSPENSION.

In contrast, if flow operation 1708's determination is NO (understeer is not present), then at flow operation 1730, a VEHICLE OVERSTEER inquiry is made. If YES (oversteer is present), the flow operation 1732 DETERMINES OVERSTEER COMPENSATION TORQUE, followed by flow operation 1734 which DETERMINES DESIRED FRONT/REAR LATERAL TIRE FORCE, and then flow operation 1736 DETERMINES DESIRED NORMAL TIRE FORCE ADJUSTMENT OF EACH AXLE. At flow operation 1738, there is a COMMAND OF FAS TO STIFFEN FRONT SUSPENSION, AND SOFTEN REAR SUSPENSION.

In contrast, if flow operation 1730's determination is NO (oversteer is not present), then at flow operation 1760, the flow RESETS FAS COMMANDS TO ZERO. At flow operation 1790, the FIG. 17 flow operations END.

Regarding another arrangement, when the vehicle path may be previewed (e.g., via a camera image, map data, etc.), the controller may be constructed or programmed to utilize the vehicle model to predict whether vehicle will become unstable along the path or deviate from the intended path, and to activate a handling stability mechanism preemptively. The predictive controller flowchart may be described via FIG. 18.

Figure 18:
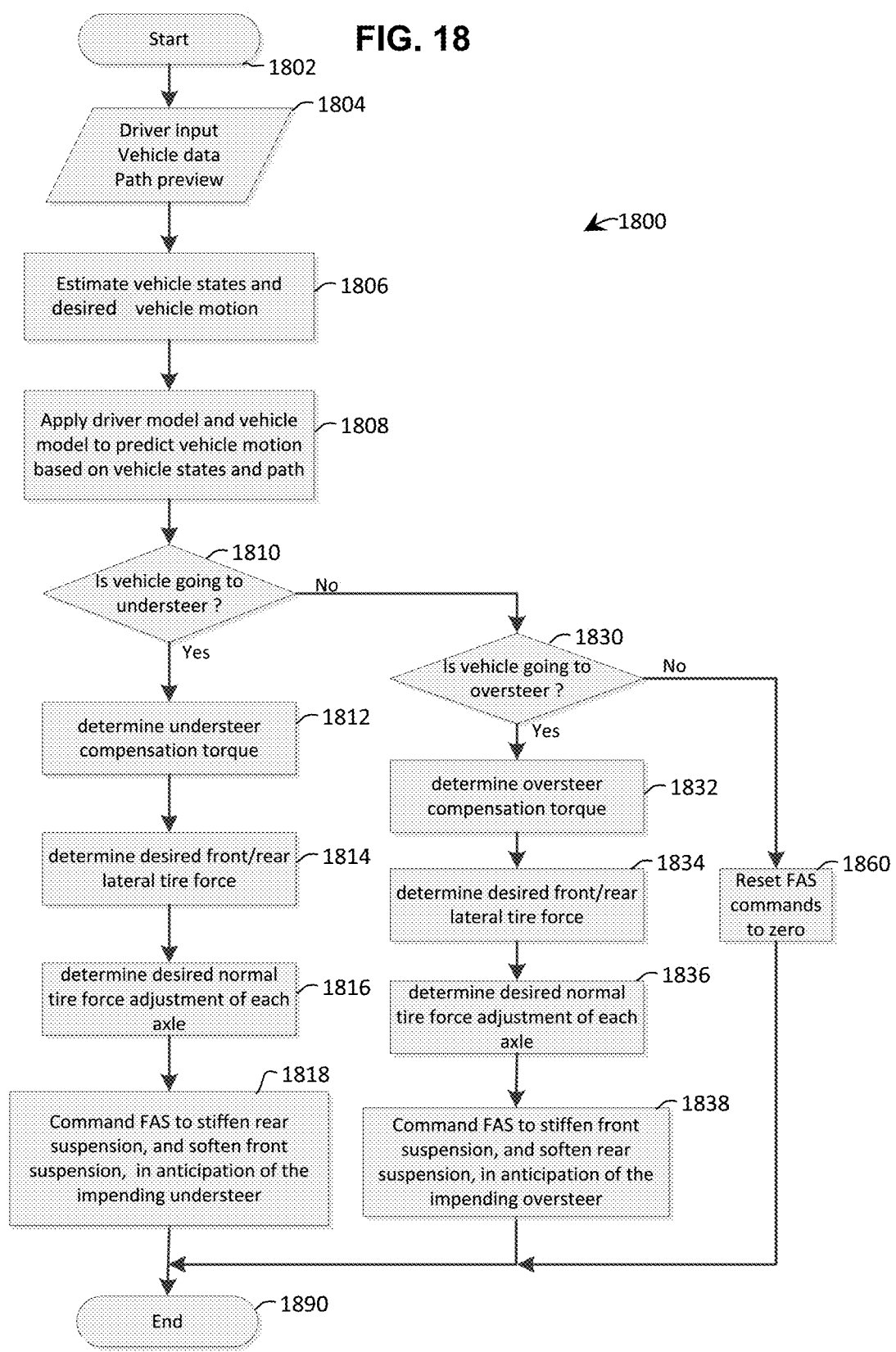
FIG. 18 illustrates an example flow of compensation by adjusting front/rear roll stiffness (with path preview).

More particularly, FIG. 18 illustrates an example flow 1800 of an FAS system control utilizing oversteer/understeer compensation by adjusting front/rear roll stiffness (with path preview). After START 1802, there may be DRIVER INPUT and VEHICLE DATA PATH PREVIEW 1804 (e.g., via camera image(s); map data, etc.). Next, there may be ESTIMATION of VEHICLE STATES and DESIRED VEHICLE MOTION 1806. At flow operation 1808, the operations may utilize the path preview and APPLY DRIVER MODEL AND VEHICLE MODEL TO PREDICT VEHICLE MOTION BASED ON VEHICLE STATES AND PATH. At flow operation 1810, an IS VEHICLE GOING TO UNDERSTEER inquiry is made. If YES (understeer is predicted), the flow operation 1812 DETERMINES UNDERSTEER COMPENSATION TORQUE, followed by flow operation 1814 which DETERMINES DESIRED FRONT/REAR LATERAL TIRE FORCE, and then flow operation 1816 DETERMINES DESIRED NORMAL TIRE FORCES ADJUSTMENT OF EACH AXLE. At flow operation 1818, there is an operation to COMMAND FAS TO STIFFEN REAR SUSPENSION, AND SOFTEN FRONT SUSPENSION, IN ANTICIPATION OF THE IMPENDING UNDERSTEER.

In contrast, if flow operation 1810's determination is NO (understeer is not predicted), then at flow operation 1830, an IS VEHICLE GOING TO OVERSTEER inquiry is made. If YES (oversteer is predicted), the flow operation 1832 DETERMINES OVERSTEER COMPENSATION TORQUE, followed by flow operation 1834 which DETERMINES DESIRED FRONT/REAR LATERAL TIRE FORCE, and then flow operation 1836 DETERMINES DESIRED NORMAL TIRE FORCE ADJUSTMENT OF EACH AXLE. At flow operation 1838, there is an operation to COMMAND FAS TO STIFFEN FRONT SUSPENSION, AND SOFTEN REAR SUSPENSION, IN ANTICIPATION OF THE IMPENDING OVERSTEER.

In contrast, if flow operation 1830's determination is NO (oversteer is not predicted), then at flow operation 1860, the flow RESETS FAS COMMANDS TO ZERO. At flow operation 1890, the FIG. 18 flow operations END.

FAS System Control, for Example, by Exploiting Toe/Camber:

For vehicles with an emphasized bump steer effect (or similarly a tire camber effect), the FAS can utilize its strong roll control authority to influence the handling dynamics through the tire toe (and camber) channels. When understeer or oversteer may be sensed, the controller may set the vehicle body roll angle to a determined value, thus utilizing the toe/camber changes to reduce the instability. The controller flowchart may be described via FIG. 19.

Figure 19:
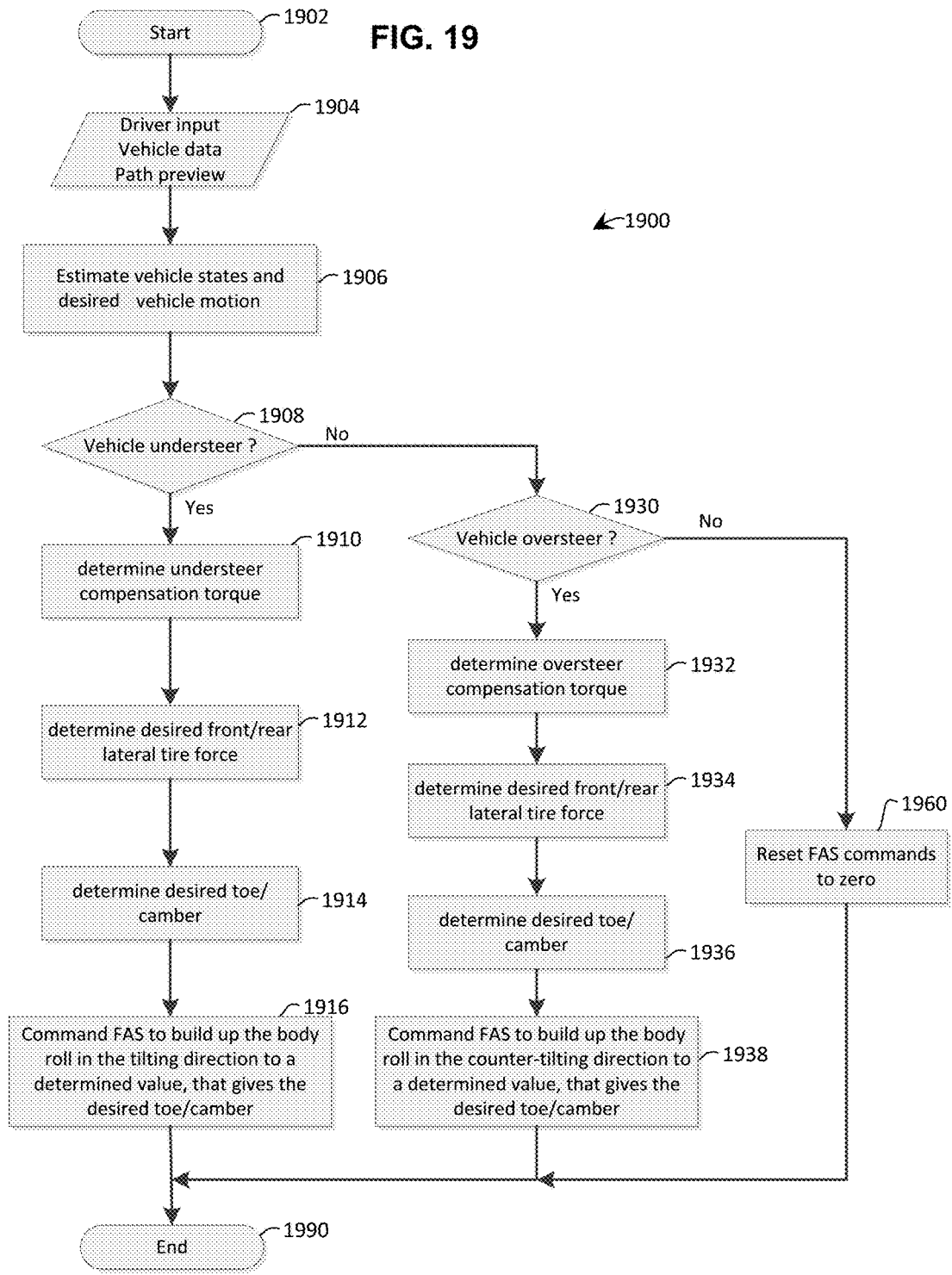
FIG. 19 illustrates an example flow of oversteer/understeer compensation by affecting toe/camber.

FIG. 19 illustrates an example flow 1900 of an oversteer/understeer compensation by affecting toe/camber. After START 1902, there may be DRIVER INPUT and VEHICLE DATA PATH PREVIEW 1904 (e.g., via camera image(s); map data, etc.). Next, there may be ESTIMATION of VEHICLE STATES and DESIRED VEHICLE MOTION 1906. At flow operation 1908, a VEHICLE UNDERSTEER inquiry is made. If YES (understeer is present), the flow operation 1910 DETERMINES UNDERSTEER COMPENSATION TORQUE, followed by flow operation 1912 which DETERMINES DESIRED FRONT/REAR LATERAL TIRE FORCE, and then flow operation 1914 which DETERMINES DESIRED TOE CAMBER. At flow operation 1916, there is a COMMAND OF FAS TO BUILD UP THE BODY ROLL IN THE TILTING DIRECTION TO A PREDETERMINED VALUE, THAT GIVES THE DESIRED TOE/CAMBER.

In contrast, if flow operation 1908's determination is NO (understeer is not present), then at flow operation 1930, a VEHICLE OVERSTEER inquiry is made. If YES (oversteer is present), the flow operation 1932 DETERMINES OVERSTEER COMPENSATION TORQUE, followed by flow operation 1934 which DETERMINES DESIRED FRONT/REAR LATERAL TIRE FORCE, and then flow operation 1936 DETERMINES DESIRED TOE/CAMBER. At flow operation 1938, there is a COMMAND OF FAS TO BUILD UP THE BODY ROLL IN THE COUNTER-TILTING DIRECTION TO A DETERMINED VALUE, THAT GIVES THE DESIRED TOE/CAMBER.

In contrast, if flow operation 1930's determination is NO (oversteer is not present), then at flow operation 1960, the flow RESETS FAS COMMANDS TO ZERO. At flow operation 1990, the FIG. 19 flow operations END.

Regarding another arrangement, when the vehicle path may be previewed (e.g., via a camera image, map data, etc.), the controller may be constructed or programmed to utilize the vehicle model to predict whether the vehicle will become unstable along the path or deviate from the intended path, and to activate a handing stability mechanism preemptively. The predictive controller flowchart may be described via FIG. 20.

Figure 20:
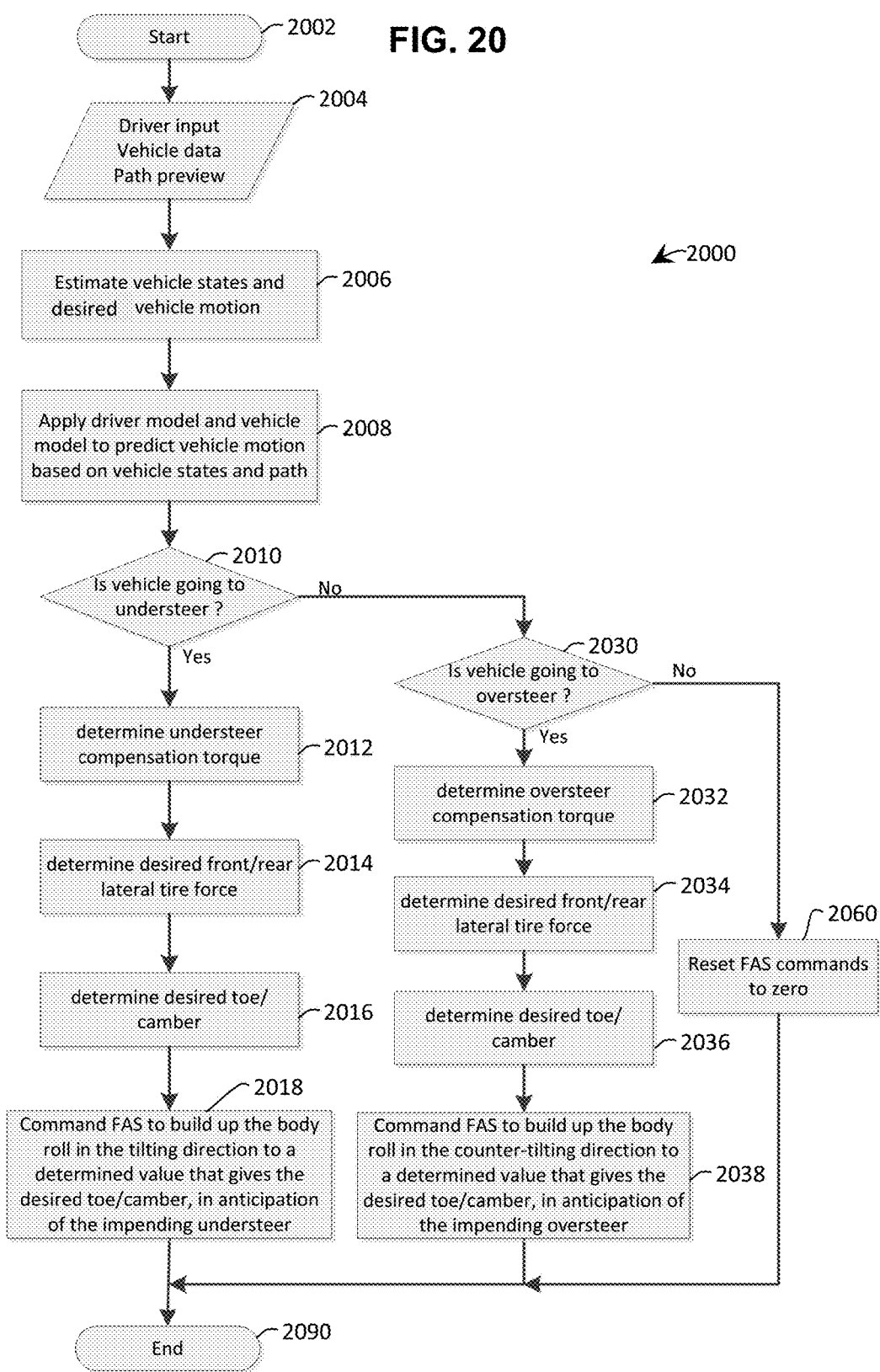
FIG. 20 illustrates an example flow of oversteer/understeer compensation by affecting toe/camber (with path preview).

More particularly, FIG. 20 illustrates an example flow 2000 of an FAS system control utilizing oversteer/understeer compensation by affecting toe/camber (with path preview). After START 2002, there may be DRIVER INPUT and VEHICLE DATA PATH PREVIEW 2004 (e.g., via camera image(s); map data, etc.). Next, there may be ESTIMATION of VEHICLE STATES and DESIRED VEHICLE MOTION 2006. At flow operation 2008, the operations may utilize the path preview and APPLY DRIVER MODEL AND VEHICLE MODEL TO PREDICT VEHICLE MOTION BASED ON VEHICLE STATES AND PATH. At flow operation 2010, an IS VEHICLE GOING TO UNDERSTEER inquiry is made.

If YES (understeer is predicted), the flow operation 2012 DETERMINES UNDERSTEER COMPENSATION TORQUE, followed by flow operation 2014 which DETERMINES DESIRED FRONT/REAR LATERAL TIRE FORCE, and then flow operation 2016 DETERMINES DESIRED TOE/CAMBER. At flow operation 2018, there is an operation to COMMAND FAS TO BUILD UP THE BODY ROLL IN THE TILTING DIRECTION TO A PREDETERMINED VALUE THAT GIVES THE DESIRED TOE/AMBER, IN ANTICIPATION OF THE IMPENDING UNDERSTEER.

In contrast, if flow operation 2010's determination is NO (understeer is not predicted), then at flow operation 2030, an IS VEHICLE GOING TO OVERSTEER inquiry is made. If YES (oversteer is predicted), the flow operation 2032 DETERMINES OVERSTEER COMPENSATION TORQUE, followed by flow operation 2034 which DETERMINES DESIRED FRONT/REAR LATERAL TIRE FORCE, and then flow operation 2036 DETERMINES DESIRED TOE/CAMBER. At flow operation 2038, there is an operation to COMMAND FAS TO BUILD UP THE BODY ROLL IN THE COUNTER-TILTING DIRECTION TO A PREDETERMINED VALUE THAT GIVES THE DESIRED TOE/CAMBER, IN ANTICIPATION OF THE IMPENDING OVERSTEER.

In contrast, if flow operation 2030's determination is NO (oversteer is not predicted), then at flow operation 2060, the flow RESETS FAS COMMANDS TO ZERO. At flow operation 2090, the FIG. 20 flow operations END.

To conclude, the present invention may be performed in a reactionary manner (e.g., actual undesirable motion (e.g., understeer or oversteer) occurring in real-time triggers the invention or calculate and apply compensation to offset), or in a preemptive manner (e.g., undesirable motion (e.g., understeer or oversteer) predicted to occur in the future, triggers the invention to calculate and apply compensation to preempt or avoid the actual onset of the undesirable motion.

While the present teachings have been disclosed in terms of example embodiments in order to facilitate a better understanding, it should be appreciated that the present teachings can be embodied in various ways without departing from the scope thereof. Therefore, the invention should be understood to include all possible embodiments which can be embodied without departing from the scope of the invention set out in the appended claims.

For the purposes of this specification and appended claims, unless otherwise indicated, all numbers expressing quantities, percentages or proportions, and other numerical values used in the specification and claims, may be to be understood as being modified in all instances by the term "about" or "substantially". Accordingly, unless indicated to the contrary, the numerical parameters set forth in the written description and claims may be approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It may be noted that, as used in this specification and the appended claims, the singular forms "a," "an," and "the," include plural referents unless expressly and unequivocally limited to one referent. As used herein, the term "include" and its grammatical variants may be intended to be non-limiting, such that recitation of items in a list may be not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as example only.

What is claimed is:

1. A method for compensating for understeer or oversteer behavior in a vehicle having a fully active suspension, comprising:
    determining whether an understeer or oversteer condition exists;
    determining a compensation torque needed to correct the understeer or oversteer condition; and
    generating the compensation torque by using the fully active suspension to shift tire loads between tires.

2. The method of claim 1, wherein generating the compensation torque comprises:
    reducing normal force on driven wheels of the vehicle, using the fully active suspension and/or
    balancing normal forces on tires of one axle while increasing normal forces on tires of another axle of the vehicle, using the fully active suspension.

3. The method of claim 1, wherein generating the compensation torque comprises:
    balancing front tire normal forces when an understeer condition is present and/or
    increasing rear tire normal forces when an understeer condition is present.

4. The method of claim 1, wherein generating the compensation torque comprises:
    balancing front rear normal forces when an oversteer condition is present and/or
    increasing front tire normal forces when an oversteer condition is present.

5. A method of compensating for understeer or oversteer behavior in a throttle-on situation in a vehicle having a fully active suspension, comprising:
    estimating desired vehicle motion;
    determining whether an understeer condition or an oversteer condition exists;
    determining a compensation torque needed to achieve the desired vehicle motion; and
    generating the compensation torque by using the fully active suspension to adjust tire loads dynamically.

6. The method of claim 5, wherein generating the compensation torque comprises:
    reducing normal force on driven wheels of the vehicle, using the fully active suspension and/or
    balancing normal forces on tires of one axle while increasing normal forces on tires of another axle of the vehicle, using the fully active suspension.

7. The method of claim 5, wherein generating the compensation torque comprises:
    balancing front tire normal forces when an understeer condition is present and/or
    increasing rear tire normal forces when an understeer condition is present.

8. The method of claim 5, wherein generating the compensation torque comprises:
    balancing front rear normal forces when an oversteer condition is present and/or increasing front tire normal forces when an oversteer condition is present.

9. A method of providing sustained compensation for a driving condition in a vehicle having a fully active suspension, comprising:
estimating desired vehicle motion;
determining if an understeer condition or an oversteer condition exists;
determining a compensation torque needed to achieve the desired vehicle motion; and
stiffening one of front and rear suspensions of the vehicle and softening the other of the front and rear suspensions, to generate the compensation torque using the fully active suspension.

10. The method of claim 9, comprising stiffening the rear suspension and softening the front suspension of the vehicle, when an understeer condition exists.

11. The method of claim 9, comprising stiffening the front suspension and softening the rear suspension of the vehicle, when an oversteer condition exists.

12. A method for providing compensation for a predicted driving condition in a vehicle having a fully active suspension, comprising:
estimating desired vehicle motion;
predicting if a driving condition will occur;
determining a compensation torque needed to achieve the desired vehicle motion, in view of the predicted driving condition; and
generating the compensation torque using the fully active suspension, in anticipation of the predicted driving condition.

13. The method of claim 12, wherein the predicted driving condition is an oversteer condition.

14. The method of claim 13, wherein generating the compensation torque comprises stiffening a front suspension and softening a rear suspension using the fully active suspension, in anticipation of the predicted oversteer condition.

15. The method of claim 14, wherein generating the compensation torque comprises increasing inner front tire and outer rear tire normal forces using the fully active suspension, in anticipation of the predicted oversteer condition.

16. The method of claim 12, wherein the predicted driving condition is an understeer condition.

17. The method of claim 16, wherein generating the compensation torque comprises stiffening the rear suspension and softening a front suspension using the fully active suspension, in anticipation of the predicted understeer condition.

18. The method of claim 17, wherein generating the compensation torque comprises increasing inner rear tire and outer front tire normal forces using the fully active suspension, in anticipation of the predicted understeer condition.

19. The method of claim 12, wherein:
the predicted driving condition is a body roll of the vehicle; and
adjusting the body roll of the vehicle in one of a tilting direction and a counter-tilting direction using the fully active suspension, to generate the compensation torque.

20. The method of claim 19, further comprising determining at least one of desired front lateral tire force and rear lateral tire force.

21. The method of claim 19, further comprising determining at least one of desired toe angle and desired camber angle.

22. The method of claim 19, wherein adjusting the body roll of the vehicle includes affecting toe angle and/or camber angle.

23. A vehicle control system, comprising:
a fully active suspension; and
a controller configured to:
estimate desired vehicle motion;
predict if a driving condition will occur;
determine a compensation torque needed to achieve the desired vehicle motion, in view of the predicted driving condition; and
generate the compensation torque using the fully active suspension, in anticipation of the predicted driving condition.

24. The vehicle control system of claim 23, wherein the controller is configured to stiffen a front suspension and soften a rear suspension to generate the compensation torque, in anticipation of a predicted oversteer condition.

25. The vehicle control system of claim 23, wherein the controller is configured to increase inner front tire and outer rear tire normal forces to generate the compensation torque, in anticipation of a predicted oversteer condition.

26. The vehicle control system of claim 23, wherein the controller is configured to stiffen a rear suspension and soften a front suspension to generate the compensation torque, in anticipation of a predicted understeer condition.

27. The vehicle control system of claim 23, wherein the controller is configured to:
reduce normal force on driven wheels of the vehicle; and/or
balance normal forces on tires of one axle while increasing normal forces on tires of another axle of the vehicle, to generate the compensation torque.

28. The vehicle control system of claim 23, wherein the controller is configured to:
balance front tire normal forces and/or increase rear tire normal forces, to generate an understeer compensation torque.

29. The vehicle control system of claim 23, wherein the controller is configured to:
balance front rear normal forces and/or increase front tire normal forces to generate an oversteer compensation torque.

* * * * *